United States Patent
Washizu et al.

(10) Patent No.: US 11,000,949 B2
(45) Date of Patent: May 11, 2021

(54) ROBOT FOR CONTROLLING LEARNING IN VIEW OF OPERATION IN PRODUCTION LINE, AND METHOD OF CONTROLLING THE SAME

(71) Applicant: FANUC CORPORATION, Yamanashi (JP)

(72) Inventors: Shinichi Washizu, Yamanashi (JP); Hajime Suzuki, Yamanashi (JP); Kaimeng Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 458 days.

(21) Appl. No.: 15/901,811

(22) Filed: Feb. 21, 2018

(65) Prior Publication Data
US 2018/0257227 A1 Sep. 13, 2018

(30) Foreign Application Priority Data
Mar. 9, 2017 (JP) .............................. JP2017-045293

(51) Int. Cl.
*B25J 13/08* (2006.01)
*B25J 9/16* (2006.01)

(52) U.S. Cl.
CPC ........... *B25J 9/1641* (2013.01); *B25J 9/1664* (2013.01); *B25J 9/1697* (2013.01); *B25J 13/085* (2013.01);
(Continued)

(58) Field of Classification Search
CPC ...... B25J 9/1641; B25J 13/085; B25J 13/089; B25J 9/1664; B25J 9/1697; B25J 9/163; B25J 9/1602; B25J 13/088; Y10S 901/47; Y10S 901/03; G05B 2219/39195; G05B 2219/37435; G05B 2219/37432
See application file for complete search history.

(56) References Cited

U.S. PATENT DOCUMENTS

| 9,415,518 B2 * | 8/2016 | Motoyoshi | ............. B25J 9/1641 |
| 9,604,359 B1 * | 3/2017 | Grotmol | ................ B25J 9/1697 |

(Continued)

FOREIGN PATENT DOCUMENTS

| JP | 2011-167817 A | 9/2011 |
| JP | 2011-192267 A | 9/2011 |

(Continued)

*Primary Examiner* — Masud Ahmed
(74) *Attorney, Agent, or Firm* — Hauptman Ham, LLP

(57) ABSTRACT

A control device includes a learning control part in which a difference is calculated between a target position and an actual position of a portion detected based on a sensor, and an operation-speed change rate is increased or reduced several times within a maximum value of the operation-speed change rate set for increasing or reducing the operation speed of a robot mechanism unit and within allowance conditions of vibrations occurring at the portion to be controlled; meanwhile, learning is repeated to calculate an updated compensation amount based on the difference and a previous compensation amount previously calculated for suppressing vibrations at each operation-speed change rate, and a convergent compensation amount and a convergent operation-speed change rate are stored after convergence of the compensation amount and the operation-speed change rate.

6 Claims, 3 Drawing Sheets

(52) U.S. Cl.
CPC ............ B25J 13/089 (2013.01); *Y10S 901/03* (2013.01); *Y10S 901/47* (2013.01)

(56) References Cited

U.S. PATENT DOCUMENTS

2012/0296471 A1* 11/2012 Inaba .................. B25J 9/163
  700/253
2016/0378938 A1* 12/2016 Kuhrt .................. G16H 40/63
  700/302

FOREIGN PATENT DOCUMENTS

| JP | 2012-240142 A | 12/2012 |
| JP | 2013-41478 A | 2/2013 |

\* cited by examiner

ROBOT FOR CONTROLLING LEARNING IN VIEW OF OPERATION IN PRODUCTION LINE, AND METHOD OF CONTROLLING THE SAME

RELATED APPLICATIONS

The present application claims priority to Japanese Patent Application No. 2017-045293 filed on Mar. 9, 2017, the disclosure of which is hereby incorporated by reference herein in its entirety.

BACKGROUND OF THE INVENTION

1. Field of the Invention

The present invention relates to a robot control technique and particularly relates to a robot for controlling learning in view of an operation in a production line and a method of controlling the same.

2. Description of the Related Art

Increasing the speed of robot operations and reducing takt time are directly related to production efficiency. However, when the speed of the robot operation is increased a certain degree or higher, a distal end of the robot may vibrate due to, for example, insufficient rigidity of the reducer and the robot arm. As a solution to this problem, a method is proposed in which a sensor is attached to the distal end of a robot to measure vibrations during operation. This allows learning control on vibrations at a distal end of the robot while accelerating the robot operation (For example, see Japanese Unexamined Patent Publication (Kokai) No. 2011-167817).

SUMMARY OF THE INVENTION

In an actual production line, a robot may incorrectly operate an object or damage the object depending on the magnitude of vibrations at a distal end of the robot. Thus, during and at the completion of learning, an allowance for vibrations is quite important. If vibrations exceed the allowance, a request to a production line cannot be responded, requiring additional learning at a lower operation speed. Moreover, an operator needs to adjust a reduction in operation speed by trial and error.

If a high-speed operation during learning causes vibrations at a distal end of the robot which exceed the allowance, learning is not allowed during operation of the production line. In this case, learning needs to be conducted without an object. However, the production line is stopped so as to reduce an operating rate, causing a large loss to the user. Furthermore, some programs acquired through teaching need to be executed in the presence of an object. In such a case, learning becomes difficult.

Thus, techniques of learning control in view of an operation in a production line have been demanded.

An embodiment of the present disclosure provides a robot including a robot mechanism unit provided with a sensor for detecting an actual position of a portion to be controlled as a target of position control, and a control device which controls an operation of the robot mechanism unit according to an operation program, the control device including: a learning control part which calculates a difference between a target position and an actual position of the portion detected based on the sensor by operating the robot mechanism unit in response to an operation command of one of the target path and the target position of the portion to be controlled, and conducts learning for calculating an updated compensation amount based on the difference and a previous compensation amount previously calculated for bringing the actual position of the portion to be controlled to the target position; and a robot control part which receives the operation command and controls an operation of the robot mechanism unit by using the received operation command and the updated compensation amount calculated by the learning control part, the learning control part including: an operation-speed change-rate adjustment part which increases or reduces an operation-speed change rate several times within a maximum value of the operation-speed change rate set for increasing or reducing the operation speed of the robot mechanism unit and within allowance conditions of vibrations occurring at the portion to be controlled; a compensation amount calculation part which calculates the updated compensation amount in order to suppress vibrations at each operation-speed change rate; and a memory which stores a convergent compensation amount and a convergent operation-speed change rate after convergence of the compensation amount and the operation-speed change rate.

Another embodiment of the present disclosure provides a method of controlling a robot including a robot mechanism unit provided with a sensor for detecting an actual position of a portion to be controlled as a target of position control, and a control device which controls an operation of the robot mechanism unit according to an operation program, the method including the steps of: calculating a difference between a target position and an actual position of the portion detected based on the sensor by operating the robot mechanism unit in response to an operation command of one of the target path and the target position of the portion to be controlled, and; increasing or reducing an operation-speed change rate several times within a maximum value of the operation-speed change rate set for increasing or reducing an operation speed of the robot mechanism unit and within allowance conditions of vibrations occurring at the portion to be controlled; repeating learning for calculating an updated compensation amount based on the difference and a previous compensation amount previously calculated for suppressing vibrations at each operation-speed change rate; and storing a convergent compensation amount and a convergent operation-speed change rate after convergence of the compensation amount and the operation-speed change rate.

DETAILED DESCRIPTION

Figure 1:
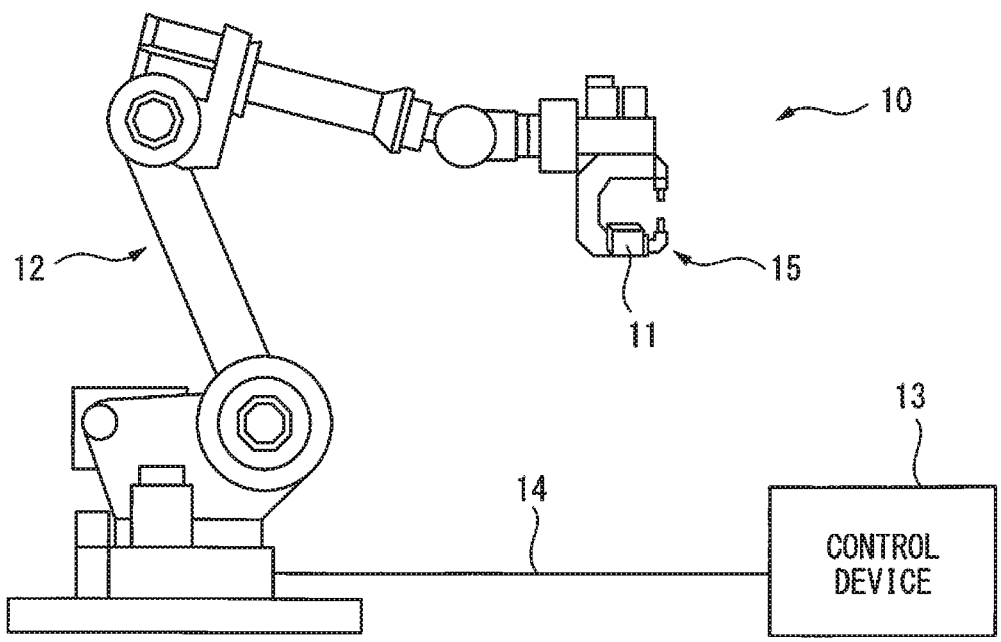
FIG. 1 is a schematic diagram showing a robot according to an embodiment.

An embodiment of the present disclosure will be specifically described below with reference to the accompanying drawings. In the drawings, the same or similar constituent elements are indicated by the same or similar symbols. Moreover, the embodiment described below does not limit the technical scope and the meanings of terms of the invention described in the claims.

Figure 2:
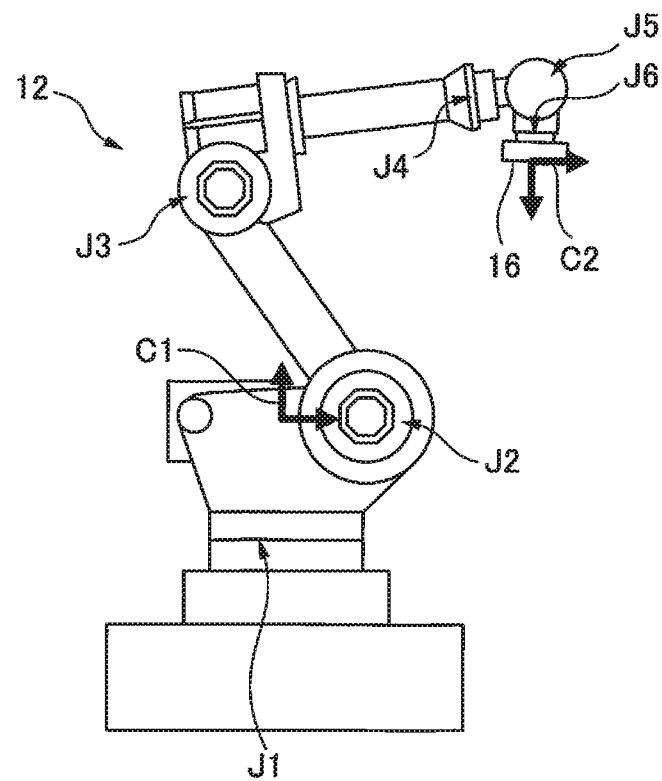
FIG. 2 is a configuration diagram showing a robot mechanism unit according to the embodiment.

FIG. 1 is a schematic diagram showing a robot 10 according to the present embodiment. FIG. 2 is a configuration diagram showing a robot mechanism unit 12 according to the present embodiment. As shown in FIG. 1, the robot 10 includes a robot mechanism unit 12 which is provided with a sensor 11 for detecting an actual position of a portion to be controlled as a target of position control, and a control device 13 which controls an operation of the robot mechanism unit 12 according to an operation program. The sensor 11 can communicate with the control device 13 through wired or radio communications. The robot mechanism unit 12 can communicate with the control device 13 through a cable 14.

The sensor 11 is an acceleration sensor which is attached to a robot distal end 15, which is an example of a portion to be controlled, to detect the acceleration of the robot distal end 15 in three axial directions. Triaxial acceleration detected by the sensor 11 is converted to a 3D position by the control device 13. If the 3D position at the robot distal end 15 can be finally calculated, the sensor 11 may acquire data other than acceleration, e.g., a position, a speed, an angular speed, a force, the arrival time of a laser or the like, and an image. In other embodiments, the sensor 11 may be, for example, a gyro sensor, an inertial sensor, a force sensor, a laser tracker, a camera, or a motion capture device.

As shown in FIG. 2, the robot mechanism unit 12 is a known robot manipulator including six joint axes J1 to J6, each having a servomotor (not shown). The robot mechanism unit 12 defines at least a world coordinate system C1 fixed in the space and a mechanical interface coordinate system C2 located at the position of a flange 16. The triaxial acceleration detected by the sensor 11 is converted from the 3D position of the mechanical interface coordinate system to the 3D position of a world frame by the control device 13 according to a known method.

Figure 3:
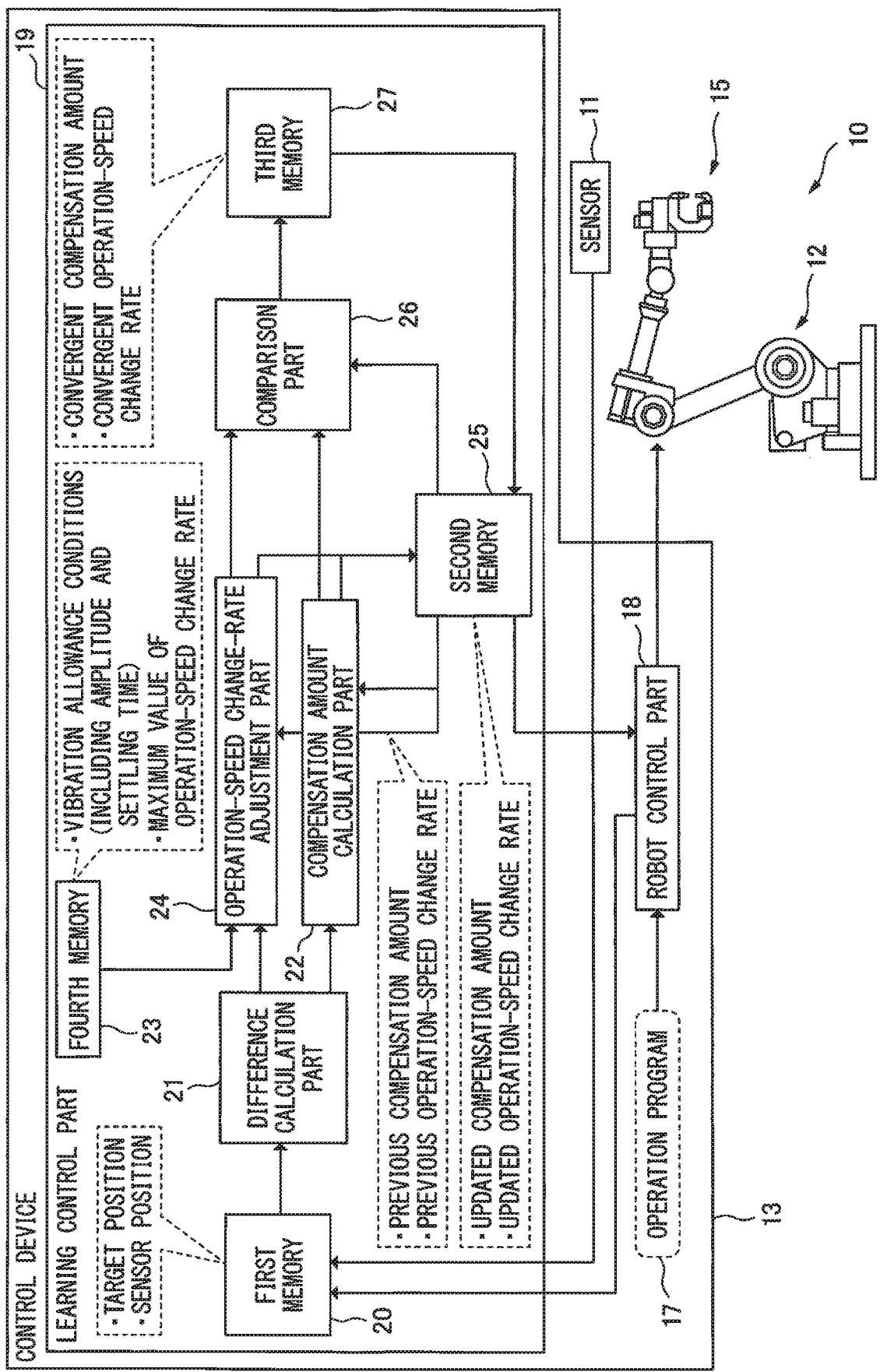
FIG. 3 is a block diagram showing a control device according to the embodiment.

FIG. 3 is a block diagram showing the control device 13 according to the present embodiment. As shown in FIG. 3, the control device 13 includes a robot control part 18 which controls an operation of the robot mechanism unit 12 according to an operation program 17. The robot control part 18 receives an operation command of a target path or a target position of the robot distal end 15 from the operation program 17 and operates the servo motor (not shown) of the robot mechanism unit 12 according to the received operation command. Any operation command can be used as long as the command can be finally converted to a position command of the target path or the target position. For example, operation commands include commands of a triaxial position, a triaxial speed, and triaxial acceleration in terms of time. The robot control part 18 performs position feedback control, speed feedback control, and current feedback control such that the actual position and the actual speed are equal to the target position and the target speed. Under the control, however, a high-speed operation of the robot 10 may vibrate the robot distal end 15 due to, for example, insufficient rigidity of the reducer and the robot arm. This may cause an error from the target path and the target position. Thus, the control device 13 includes a learning control part 19 which detects a position error through the sensor 11 attached to the robot distal end 15 and controls learning of vibrations of the robot distal end 15.

The learning control part 19 starts learning when another operation pattern (another target path and another target position) or a correction of an operation pattern is taught. The learning control part 19 includes a first memory 20 which stores an actual position of the robot distal end 15 (called "sensor position") detected based on the sensor 11, and a target position provided for the robot control part 18. The learning control part 19 further includes a difference calculation part 21 which calculates a difference between a sensor position stored in the first memory 20 and the target position. The learning control part 19 further includes a compensation amount calculation part 22 which calculates an updated compensation amount after learning a vibration suppression effect according to the difference (information including current vibration components) and a previous compensation amount previously calculated for bringing the actual position of the robot distal end 15 to the target position. Any compensation amount is allowed as long as the compensation amount can be finally converted to a position compensation amount for bringing the position of the robot distal end 15 to the target position. For example, compensation amounts include a triaxial position, a triaxial speed, and triaxial acceleration in terms of time.

The learning control part 19 further includes a fourth memory 23 which stores the maximum value of an operation-speed change rate set for increasing or reducing the operation speed of the robot mechanism unit 12 and the allowance conditions (allowances for amplitudes and settling times) of vibrations at the robot distal end 15. Moreover, the learning control part 19 includes an operation-speed change-rate adjustment part 24 which increases or reduces a previous operation-speed change rate to an updated operation-speed change rate within the maximum value of the operation-speed change rate and within the allowance conditions of vibrations. Additionally, the learning control part 19 includes a second memory 25 which stores an updated compensation amount calculated by the compensation amount calculation part 22 and the operation-speed change rate adjusted by the operation-speed change-rate adjustment part 24. The robot control part 18 controls an operation of the robot mechanism unit 12 based on the updated compensation amount and the updated operation-speed change rate which are stored in the second memory 25.

The learning control part 19 further includes a comparison part 26 which decides whether or not the ratio of the updated compensation amount and the previous compensation amount and the ratio of the updated operation-speed change rate and the previous operation speed are within a predetermined range. In other words, the comparison part 26 decides whether or not the convergence rate of the compensation amount and the convergence rate of the operation-speed change rate fall within the predetermined range (e.g., at least 98%). Moreover, the learning control part 19 includes a third memory 27 which stores a convergent compensation amount and a convergent operation-speed change rate. The first memory 20, the second memory 25, and the fourth memory 23 are preferably volatile memories such as DRAM for high-speed learning control. The third memory 27 is preferably a nonvolatile memory such as EEPROM for storing the convergent compensation amount and the convergent operation-speed change rate even after power shutdown. The convergent compensation amount and the convergent operation-speed change rate are read by the second memory 25 after power-on and are then reused by the robot control part 18.

The robot 10 may further include vibration condition input means (not shown) for inputting vibration allowance conditions (allowances for amplitudes and settling times) to be stored in the fourth memory 23. The vibration condition input means may be, for example, a liquid crystal touch panel on a teaching pendant (not shown), a keyboard, or a mouse. The vibration condition input means preferably allows the input of the vibration allowance conditions (allowances for amplitudes and settling times) of at least one of a part or a whole of the taught target path. Thus, for example, if an object held at a point A is placed at a point B by the robot 10, uniform vibration allowance conditions can be set over the process. Moreover, moderate vibration allowance conditions can be set in the process (operation) of carrying the object from point A to point B, and severe vibration allowance conditions can be set in the process of placing the object at point B (at nearly an operation stop). In other words, the control device 13 can increase the speed of an operation of the robot mechanism unit 12 in the process of carrying an object, and can suppress vibrations of the robot distal end 15 so as to prevent damage of the object in the process of placing the object.

The learning control part 19 may calculate a maximum value of an operation-speed change rate to be stored in the fourth memory 23 in advance, from a maximum speed and maximum acceleration (i.e., an allowance for a motor speed and an allowance for a motor torque) which are accepted by the robot mechanism unit 12 (i.e., a servomotor or the like). The learning control part 19 stores the maximum value of motor speed and the maximum value of motor torque at each joint axis in an operation pattern as $\omega\_max_j$ and $\tau\_max_j$ (j is the axis number of each joint axis), and the learning control part 19 calculates a maximum value $\alpha_{max}$ of an operation-speed change rate $\alpha$ which can be set for the operation pattern (or the target path) in advance.

The relationship between an operation elapsed time t and a motor target angle $\theta$ is expressed as follows:

$$\theta = f(t)(0 \leq t \leq t_{max})$$

In this case, the operation-speed change rate $\alpha$ is an index for performing an operation satisfying the following relationship:

$$\theta = f(\alpha t)\left(0 \leq t \leq \frac{t_{max}}{\alpha}\right)$$

Considering that motor speed is proportionate to $\alpha$ and motor torque is proportionate to the square of $\alpha$ in this expression, the maximum value $\alpha_{max}$ of an allowable operation-speed change rate can be calculated in advance as follows:

$$\alpha_{max} = \min\left(\frac{\omega\_alw_j}{\omega\_max_j}, \sqrt{\frac{\tau\_alw_j}{\tau\_max_j}}\right)$$

where $\omega\_alw_j$ and $\tau\_alw_j$ are the allowance of motor speed and the allowance of motor torque at each joint axis.

The control device 13 preferably further includes means for transmitting at least one of input data, stored data, and output data in the learning control part 19 to a host computer (not shown), means for outputting the data to a recording medium, or means for displaying the data on the teaching pendant (not shown). The input data in the learning control part 19 includes information indicating vibrations and cycle time in each learning time and information on operation patterns where a correction of the taught target path requires relearning. Data stored in the learning control part 19 includes a convergent compensation amount and a convergent operation-speed change rate which are stored in the third memory 27, vibration allowance conditions (allowances for amplitudes and settling times) stored in the fourth memory 23, and the maximum value of an operation-speed change rate. The output data in the learning control part 19 includes a rate of progress of learning (e.g., the ratio of the learning elapsed time and the predicted convergence time).

Figure 4:
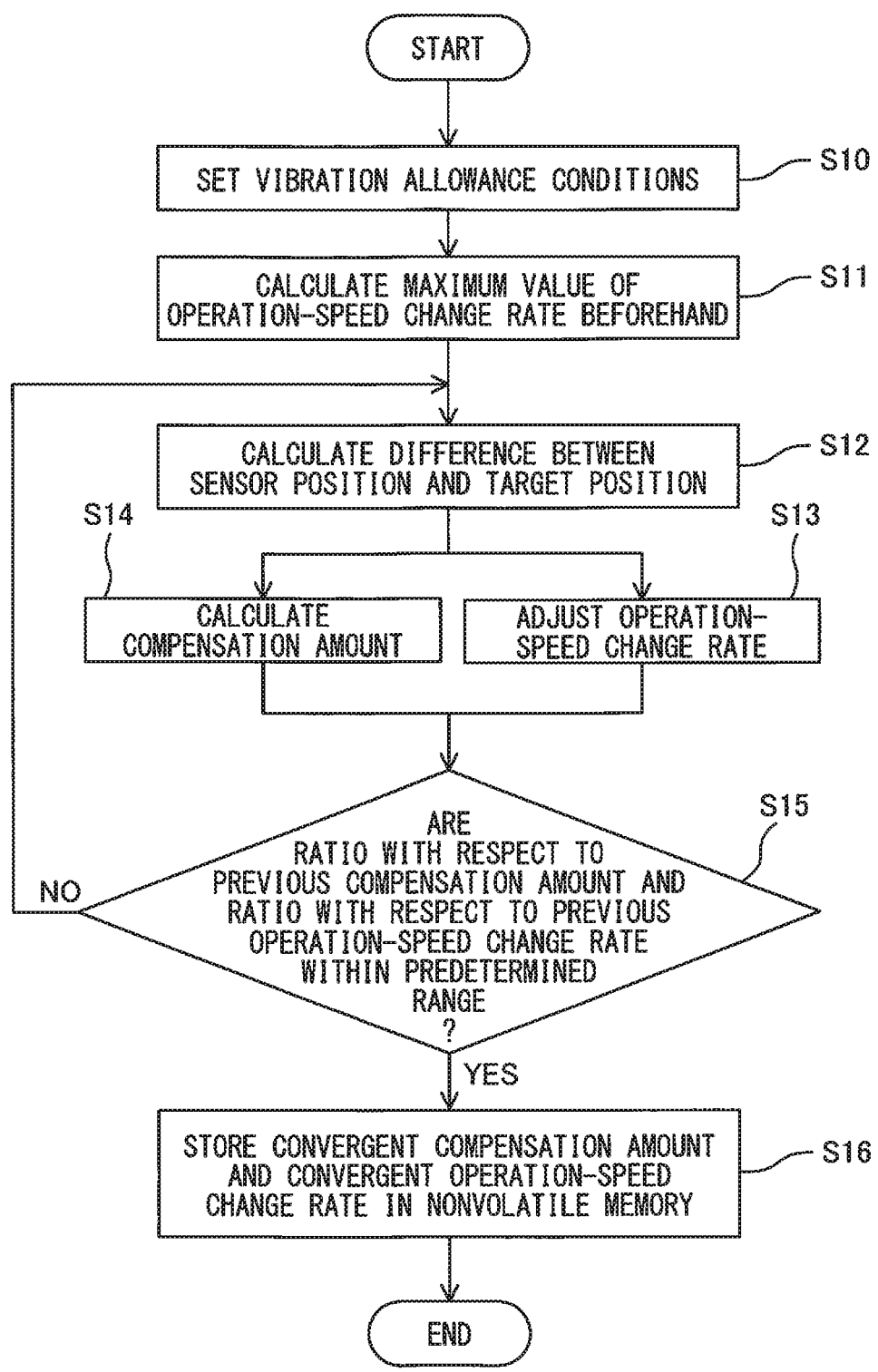
FIG. 4 is a flowchart showing a method of controlling the robot according to the embodiment.

FIG. 4 is a flowchart showing a method of controlling the robot according to the present embodiment. The control method according to the present embodiment is executed by the hardware shown in FIG. 3. The method may be installed by software, e.g., the operation program 17, in other embodiments. First, in step S10, allowance conditions (allowances for amplitudes and settling times) of vibrations at the robot distal end 15 are set on the teaching pendant by an operator before learning. In step S11, the maximum value of an operation-speed change rate is calculated in advance based on a maximum speed and maximum acceleration (e.g., an allowance for a motor speed and an allowance for a motor torque) accepted by the robot mechanism unit 12 (e.g., a servomotor).

In step S12, an object to be learned is operated to calculate a difference between the actual position of the robot distal end 15 detected by the sensor 11 and the target position. In step S13, if the difference (i.e., information including current vibration components) exceeds the allowance conditions of vibrations (allowances for amplitudes and settling times), the previous operation-speed change rate is reduced so as to be adjusted to an updated operation-speed change rate. If the difference (i.e., information including current vibration components) falls within the allowance conditions of vibrations (allowances for amplitudes and settling times), the previous operation-speed change rate is increased so as to be adjusted to an updated operation-speed change rate within the maximum value of an operation-speed change rate.

In step S14, the vibration suppression effect is learned based on the previous compensation amount and the difference (i.e., information including current vibration components), and then the updated compensation amount is calculated. In step S15, a comparison is made to decide whether the ratio of the updated compensation amount and the previous compensation amount (i.e., a rate of convergence of the compensation amount) and the ratio of the updated operation-speed change rate and the previous operation-speed change rate (i.e., a rate of convergence of the operation-speed change rate) are within the predetermined range (e.g., at least 98%). If at least one of the rate of convergence of the compensation amount and the rate of convergence of the operation-speed change rate falls outside the predetermined range (e.g., less than 98%), the process returns to step S12 to repeat learning control. If both of the rate of convergence of the compensation amount and the rate of convergence of the operation-speed change rate fall within the predetermined range (e.g., at least 98%), the process advances to step S16 to store the convergent compensation amount and the convergent operation-speed change rate in the nonvolatile memory (third memory). At the completion of the convergence of the compensation amount and the operation-speed change rate, learning is terminated.

According to the robot and the control method of the present embodiment, an operation-speed change rate is increased or reduced several times within the maximum value of an operation-speed change rate and the allowance conditions of vibrations (allowances for amplitudes and settling times); meanwhile, learning control is conducted on vibrations occurring at the robot distal end 15. Thus, even during an operation of a production line, vibrations at the robot distal end 15 do not damage an object. In other words, even during an operation of the production line, learning control of vibrations at the robot distal end 15 is allowed while increasing the operation speed of the robot 10.

The software in the above-mentioned embodiment can be provided as software recorded on a computer-readable non-temporary recording medium, a CD-ROM or the like. The present invention is not limited by the embodiment described in the present specification. It should be understood that various modifications can be made within the scope of claims.

The invention claimed is:

1. A method of controlling a robot comprising a robot mechanism unit provided with a sensor for detecting an actual position of a portion to be controlled as a target of position control, and a control device which controls an operation of the robot mechanism unit according to an operation program, the method comprising:
  inputting allowance conditions of vibrations occurring at the portion to be controlled;
  setting the allowance conditions which include at least an allowance for amplitude of the vibrations;
  calculating a difference between a target position and an actual position of the portion detected based on the sensor by operating the robot mechanism unit in response to an operation command of one of a target path and a target position of the portion to be controlled;
  increasing or reducing an operation-speed change rate several times within a maximum value of the operation-speed change rate set for increasing or reducing an operation speed of the robot mechanism unit and within the allowance conditions of vibrations occurring at the portion to be controlled;
  repeating learning for calculating an updated compensation amount based on the difference and a previous compensation amount previously calculated for suppressing the vibrations at each operation-speed change rate; and
  storing a convergent compensation amount and a convergent operation-speed change rate after convergence of the compensation amount and the operation-speed change rate.

2. A robot comprising a robot mechanism unit provided with a sensor for detecting an actual position of a portion to be controlled as a target of position control, and a control device which controls an operation of the robot mechanism unit according to an operation program, the control device comprising:
  means for inputting allowance conditions of vibrations occurring at the portion to be controlled, wherein the control device sets the allowance conditions which include at least an allowance for amplitude of the vibrations;
  a learning control part which calculates a difference between a target position and an actual position of the portion detected based on the sensor by operating the robot mechanism unit in response to an operation command of one of a target path and a target position of the portion to be controlled, and conducts learning for calculating an updated compensation amount based on the difference and a previous compensation amount previously calculated for bringing the actual position of the portion to be controlled to the target position; and
  a robot control part which receives the operation command and controls an operation of the robot mechanism unit by using the received operation command and the updated compensation amount calculated by the learning control part, the learning control part comprising:
  an operation-speed change-rate adjustment part which increases or reduces an operation-speed change rate several times within a maximum value of the operation-speed change rate set for increasing or reducing an operation speed of the robot mechanism unit and within the allowance conditions of vibrations occurring at the portion to be controlled;
  a compensation amount calculation part which calculates the updated compensation amount in order to suppress the vibrations at each operation-speed change rate; and
  a memory which stores a convergent compensation amount and a convergent operation-speed change rate after convergence of the compensation amount and the operation-speed change rate.

3. The robot according to claim 2, wherein the means for inputting allowance conditions of vibrations allows the input of the vibration allowance conditions for at least one of a part or a whole of the target path of the portion to be controlled.

4. The robot according to claim 2, wherein the learning control part calculates the maximum value of the operation-speed change rate beforehand based on a maximum speed and a maximum acceleration which are accepted by the robot mechanism unit.

5. The robot according to claim 2, wherein the control device includes means for transmitting at least one of input data, stored data, and output data in the learning control part to a host computer, means for outputting the data to a recording medium, or means for displaying the data on a teach pendant.

6. The robot according to claim 2, wherein the sensor is one of an acceleration sensor, a gyro sensor, an inertial sensor, a force sensor, a laser tracker, a camera, and a motion capture device.

* * * * *